Aug. 28, 1951 J. NAYMIK 2,566,242
REMOVABLE CLOSURE FOR DEFERRED ACTION BATTERIES
Filed March 8, 1946 2 Sheets-Sheet 1

WITNESSES:
E. A. McCloskey
E. F. Oberheim

INVENTOR
Joseph Naymik.
BY
Paul E. Friedemann
ATTORNEY

Aug. 28, 1951  J. NAYMIK  2,566,242
REMOVABLE CLOSURE FOR DEFERRED ACTION BATTERIES
Filed March 8, 1946  2 Sheets-Sheet 2

WITNESSES:
E. A. McCloskey
E. F. Oberheim

INVENTOR
Joseph Naymik.
BY
Paul E. Friedemann
ATTORNEY

Patented Aug. 28, 1951

2,566,242

UNITED STATES PATENT OFFICE 2,566,242

REMOVABLE CLOSURE FOR DEFERRED ACTION BATTERIES

Joseph Naymik, Sharon, Pa., assignor, by mesne assignments, to the United States of America as represented by the Secretary of the Navy Application March 8, 1946, Serial No. 653,189

6 Claims. (Cl. 114—20)

This invention relates generally to control apparatus, and more particularly to an apparatus, for flooding the battery compartment or casket of a torpedo, utilizing a primary battery having seawater as the electrolyte.

The Government of the United States has been granted a certain royalty-free license for governmental purposes with respect to the invention disclosed herein.

One object of this invention is to provide an apparatus for opening the ports to a torpedo battery compartment which is simple in construction and effective in operation.

Another object of this invention is to provide a control apparatus for flooding a torpedo battery compartment which requires a minimum of electrical power for operation.

Another object of this invention is to provide an apparatus for flooding a torpedo battery compartment in which the motion of the torpedo through the water is utilized to induce a circulating flow of water through the battery compartment.

Figure 1:
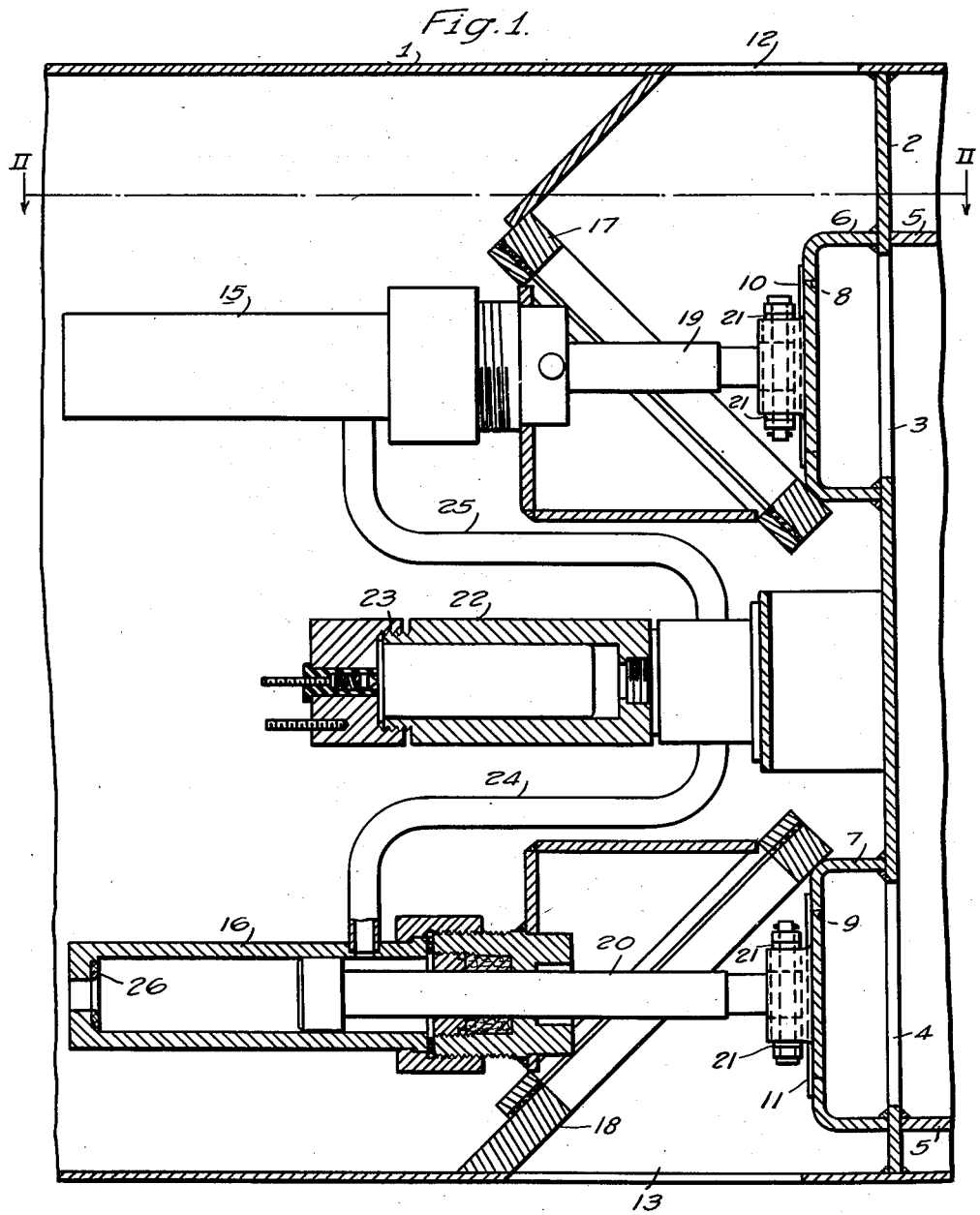
Figure 2:
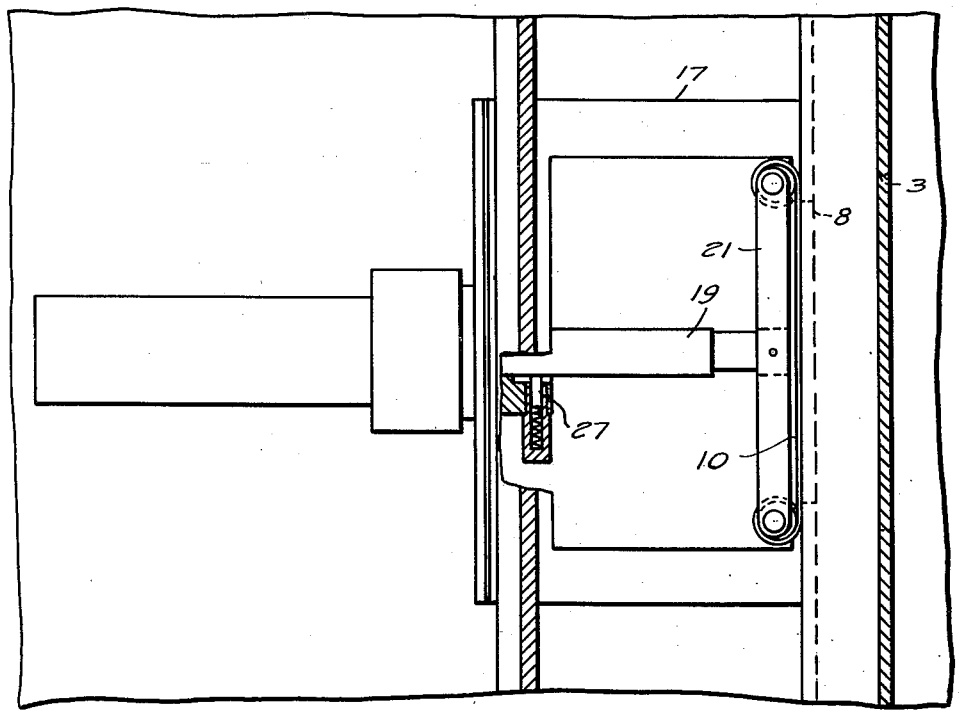

The foregoing statements are merely illustrative of the various aims and objects of this invention. Other objects and advantages will become apparent upon a study of the following specification when considered in conjunction with the accompanying drawings, in which:

Figure 1 is a longitudinal section of a portion of a torpedo body illustrating the present invention; and Fig. 2 is a sectional view taken on the line II—II of Fig. 1.

Recent developments in electrically operated torpedoes have brought into use primary batteries of the type utilizing seawater as the electrolyte. These batteries must be kept dry until they are to be used and are hence sealed in a battery casket within the torpedo hull. When the torpedo is to be launched, it is inserted into the torpedo or launching tube after which air pressure is applied and the torpedo ejected therefrom into the water. Usually about one-half second is required for the torpedo to move from the tube during which time the torpedo is accelerated to substantially full speed and all control functions, such as ripping off the battery compartment or casket covers, must be accomplished that the torpedo upon entering the water will be under full control.

In Figure 1, the torpedo hull is denoted by numeral 1, a bulkhead 2 having openings 3 and 4 therein is secured internally of the torpedo hull. The openings 3 and 4 communicate with a battery casket 5 fragmentarily shown which houses a primary battery (not shown). Openings 3 and 4 are sealed by covers 6 and 7, respectively, having openings 8 and 9 therein sealed by covers 10 and 11. Covers 10 and 11 are made of thin sheet metal, for example, copper and the contiguous surfaces are tinned and sweated together to form a water-tight seal for openings 8 and 9. A forwardly directed passageway 13 opens through the bottom side of the torpedo hull while a passageway 12 directed aft opens through the top of the torpedo hull. The arrangement is such that upon movement of the torpedo through the water, it tending to ride with the nose thereof slightly elevated to counteract the negative buoyancy, a pressure differential is created between the passageways, the lower passageway being of higher pressure than the upper. As a consequence, upon pulling of the covers, water is circulated through the battery casket, entering through the bottom openings and leaving through the top. This continually supplies fresh electrolyte to the primary battery.

The mechanism for pulling the covers 10 and 11 comprises the piston-cylinder assemblies 15 and 16 respectively supported by frameworks 17 and 18 defining the passageways 12 and 13, respectively. Piston rods 19 and 20 of the respective assemblies 15 and 16 are connected to straps 21 pivotally connected to the extremities of the covers 10 and 11. A cartridge chamber 22 having a cartridge 23 therein communicates with the cylinders of both assemblies 15 and 16 at a point in each beneath the piston, through tubes 24 and 25. In the present instance, the cartridge is fired by a small electrical impulse produced by suitable mechanism (not shown) which is actuated by an obstruction in the launching tube.

Upon firing of the cartridge, the products of combustion thereof drive the pistons to the left as viewed in assembly 16. The force thus produced is transmitted to the extremities of the covers 10 and 11 through the mechanical linkage, peeling the covers 10 and 11 from their positions over openings 8 and 9, beginning at the cover extremities and working inwardly. The piston strikes the full length of the cylinders, each seating upon a washer 26 in the end thereof to seal the cylinders, in which position the covers are completely withdrawn from the passageways 12 and 13 and are locked in retracted position by spring biased pin 27. Seawater is thus circulated through the battery casket rendering the primary battery active.

The foregoing disclosure and the showing made in the drawings are merely illustrative of the principles of this invention and are not to be interpreted in a limiting sense. The only limitations are to be determined from the scope of the appended claims.

I claim as my invention:

1. In combination, a member having an opening therein, a single piece sheet metal cover sealed over said opening, a bar straddling said cover and connected at the extremities thereof to opposite extremities of said cover, and motor means connected to said bar to pull said bar away from said member.

2. In combination, a member having an opening therein, a single piece sheet metal cover sealed over said opening, a structural member straddling said cover and connected to opposite extremities of said cover, a piston, means connecting said piston with said structural member, a cylinder for said piston, and means for supplying fluid under pressure to said cylinder.

3. In combination, a member having an opening therein, a single piece sheet metal cover sealed over said opening, a structural member straddling said cover and connected to opposite extremities of said cover, a piston, means connecting said piston with said structural member, a cylinder for said piston, a cartridge chamber communicating with said cylinder, and means for detonating a cartridge in said cartridge chamber.

4. In a torpedo adapted for operation from electrical power supplied by a primary battery in which water is utilized as the electrolyte, the combination of, a battery casket housing said primary battery, means forming entrance and exit passages through the hull of said torpedo communicating with said battery casket, means forming closures in each of said passages to seal said passages, a cylinder projecting into each passage and having a sealed connection therewith, a piston in each cylinder, means connecting each piston with the closure means in the associated passage, an orifice in the end of each cylinder for venting each cylinder, a washer arranged about each orifice, each of said pistons seating upon each of said washers upon movement thereof to the end of said cylinders, and opening said closure means, and means for applying fluid under pressure to each of said cylinders to effect movement of said pistons.

5. In a torpedo adapted for operation from electrical power supplied by a primary battery in which water is utilized as the electrolyte, the combination of, a battery casket housing said primary battery, means forming entrance and exit passages through the hull of said torpedo communicating with said battery casket, means forming closures in each of said passages to seal said passages, a cylinder projecting into each passage and having a sealed connection therewith, a piston in each cylinder, means connecting each piston with the closure means in the associated passage, an orifice in the end of each cylinder for venting each cylinder, a washer arranged about each orifice, each of said pistons seating upon each of said washers upon movement thereof to the end of said cylinders, and opening said closure means, means forming a cartridge chamber, means connecting said cartridge chamber with each of said cylinders, and means for detonating a cartridge in said cartridge chamber.

6. In a torpedo adapted for operation from electric power supplied by a primary battery in which water is utilized as the electrolyte, the combination of, a torpedo hull, a bulkhead having a pair of openings therein, sealed within said hull; a battery casket for housing said primary battery sealed to said bulkhead over said openings, means forming passages communicating with said openings through said torpedo hull, a single piece sheet metal cover soldered to said bulkhead over each of said openings, a structural member straddling each of said covers and secured to opposite extremities thereof, a cylinder extending into each of said passages and having a sealed connection therewith, a piston in each cylinder, a piston rod connecting each piston with each structural member, an orifice in the end of each cylinder for venting each cylinder, a washer arranged about each orifice, each of said pistons seating upon each of said washers upon movement thereof to the end of said cylinders, and means for applying fluid under pressure to said cylinder.

JOSEPH NAYMIK.

REFERENCES CITED

The following references are of record in the file of this patent:

UNITED STATES PATENTS

| Number | Name | Date |
|---|---|---|
| 341,536 | Zalinski | May 11, 1886 |
| 747,770 | Richard | Dec. 22, 1903 |
| 759,255 | Jacoby | Apr. 26, 1904 |
| 1,310,586 | Straub et al. | July 22, 1919 |
| 1,332,483 | Bridge | Mar. 2, 1920 |
| 1,796,200 | Grieshaber | Mar. 10, 1931 |
| 1,809,451 | Quinn | June 9, 1931 |
| 1,971,346 | Hickey | Aug. 28, 1934 |
| 2,404,144 | Riggs et al. | July 16, 1946 |
| 2,405,439 | Lubbock et al. | Aug. 6, 1946 |
| 2,419,815 | Breeze et al. | Apr. 29, 1947 |

FOREIGN PATENTS

| Number | Country | Date |
|---|---|---|
| 825,050 | France | Nov. 10, 1936 |